US012479222B2

(12) United States Patent
Tang

(10) Patent No.: US 12,479,222 B2
(45) Date of Patent: Nov. 25, 2025

(54) INKJET PRINTING STRUCTURE

(71) Applicant: GuangZhou KingTau Machinery & Electronics Equipment Co., Ltd., Guangdong (CN)

(72) Inventor: Zhenhua Tang, Guangzhou (CN)

(73) Assignee: DRIVE DIGITAL ELECTRONICS (GUANGDONG) CO., LTD., Guangzhou (CN)

( * ) Notice: Subject to any disclaimer, the term of this patent is extended or adjusted under 35 U.S.C. 154(b) by 148 days.

(21) Appl. No.: 18/409,203

(22) Filed: Jan. 10, 2024

(65) Prior Publication Data

US 2024/0227423 A1 Jul. 11, 2024

(30) Foreign Application Priority Data

Jan. 10, 2023 (CN) ......................... 202320074422.8

(51) Int. Cl.

| | |
|---|---|
| ***B41J 25/308*** | (2006.01) |
| ***B41J 19/14*** | (2006.01) |
| ***B41J 25/00*** | (2006.01) |
| ***B41J 25/304*** | (2006.01) |
| *B41J 19/00* | (2006.01) |

(52) U.S. Cl.

CPC ........... *B41J 25/308* (2013.01); *B41J 19/142* (2013.01); *B41J 25/001* (2013.01); *B41J 25/304* (2013.01); *B41J 25/3086* (2013.01); *B41J 19/00* (2013.01)

(58) Field of Classification Search

CPC ...... B41J 25/308; B41J 19/142; B41J 25/001; B41J 25/304; B41J 25/3086; B41J 19/00

See application file for complete search history.

(56) References Cited

U.S. PATENT DOCUMENTS

| | | | | |
|---|---|---|---|---|
| 10,081,206 | B1 * | 9/2018 | Meuleman | B41J 25/006 |
| 2011/0128323 | A1 * | 6/2011 | Saito | B41J 2/155 347/40 |
| 2013/0057612 | A1 * | 3/2013 | Song | B41J 3/543 347/85 |
| 2017/0313085 | A1 * | 11/2017 | Profaca | B41J 29/38 |

* cited by examiner

*Primary Examiner* — Henok D Legesse

(74) *Attorney, Agent, or Firm* — MUNCY, GEISSLER, OLDS & LOWE, P.C.

(57) ABSTRACT

An inkjet printing structure includes a crossbeam having a front guide rail and a rear guide rail provided on its bottom surface; a connecting block mounted with a first slider fitting with the front guide rail and the rear guide rail; a first linear motor arranged between the crossbeam and the connecting block; and a lifting device connected to the bottom surface of the connecting block, which includes an inner frame, an outer frame, a third drive mechanism, lifting mechanisms and a synchronizing mechanism. The inner frame moves relative to the outer frame through lifting mechanisms connected to the synchronizing mechanism. A left guide rail and a right guide rail are provided on the connecting block with a second slider installed on the outer frame to cooperate with the left and right guide rails, and a second drive mechanism is provided between the connecting block and the lifting device.

16 Claims, 13 Drawing Sheets

INKJET PRINTING STRUCTURE

CROSS REFERENCE TO RELATED APPLICATIONS

The present application claims priorities from Chinese Application No. CN 202320074422.8 filed on Jan. 10, 2023, all of which are hereby incorporated herein by reference.

TECHNICAL FIELD

The present invention relates to the technical field of printers, and more particularly, to an inkjet printing structure.

BACKGROUND

Inkjet printers are non-contact printing devices that can controllably eject ink droplets from printheads to form textual symbols and images. The printhead ejects ink through multiple ink nozzles to form droplets that pass through a very small gap and adhere to the print medium. These droplets are very small and adhere to the print medium to dry and form the desired print image or text. This technology has the advantages of high print speed, low pollution, ability to adapt to multiple print media, and so on, and is widely used in industrial and living fields.

Inkjet printing is divided into scan inkjet printing and single-pass inkjet printing according to the movement mode of the printhead carriage and print medium. Scan inkjet printing includes roll-to-roll inkjet printing and flatbed inkjet printing. Roll-to-roll inkjet printing is mainly used to print patterns on roll media such as rolled paper or fabrics; flatbed inkjet printing is used to print patterns on plate media such as boards, mobile phone shells, etc. The flatbed inkjet printing can also be used for printing on garments such as T-shirts. Single-pass inkjet printing is used to quickly print variable data required on roll media. In the single-pass inkjet printing, the printhead carriage remains stationary and the print medium moves unidirectionally at high speed.

In the prior art, the existing printer structure is mainly driven by a drive motor to drive the printing device to print. In such configuration, chain wheels or belt rails are usually used for driving in the x-axis direction. This type of drive mechanism has low transmission efficiency and is prone to friction damage. In addition, the existing guide rails are usually installed on one side of the drive motor, causing one-sided bearing for the printhead carriage which tends to tilt after prolonged use. Coupled with the one-sided belt traction, it is also prone to generate a deflection torque problem, reducing the accuracy of the printer. In addition, the existing printhead carriage can only move in two directions, and the adjustment of the carriage thus is limited.

SUMMARY OF THE INVENTION

It is therefore an object of the present invention to provide an improved inkjet printing structure, which overcomes some of the design deficiencies of the known art, such as easy wear and tear during movement of the printhead carriage, easy influence on printing accuracy, and fewer movement directions of the carriage.

The inkjet printing structure of the present invention includes a crossbeam having a front guide rail and a rear guide rail provided on a bottom surface thereof, with the front guide rail and the rear guide rail connected to the crossbeam;

a connecting block mounted with a first slider fitting with the front guide rail and the rear guide rail, wherein a first drive mechanism including a first linear motor is provided between the crossbeam and the connecting block, which is configured for driving the connecting block to move along a first direction parallel to the length direction of the crossbeam, the first linear motor being located between the front guide rail and the rear guide rail, with a first primary of the first linear motor fixedly connected to the bottom surface of the crossbeam, and a first secondary of the first linear motor fixedly connected to a top surface of the connecting block; and a lifting device connected to a bottom surface of the connecting block, the lifting device including an inner frame, an outer frame, a third drive mechanism, lifting mechanisms and a synchronizing mechanism, wherein the inner frame is configured to connect a printhead bracket, and moves relative to the outer frame through the lifting mechanisms located at both sides thereof, the synchronizing mechanism synchronizes the lifting mechanisms at both sides, both ends of the synchronizing mechanism are respectively connected to the lifting mechanisms, the third drive mechanism synchronously drives the lifting mechanisms at both sides through the synchronizing mechanism to drive the inner frame to move up and down along a third direction perpendicular to the crossbeam, and the bottom surface of the connecting block is provided with a left guide rail and a right guide rail, a second slider fitting with the left guide rail and the right guide rail is installed on the outer frame; a second drive mechanism is provided between the connecting block and the lifting device for driving the connecting block to move back and forth along a second direction perpendicular to the crossbeam.

In the present invention, with respect to the drive structure along the first direction, the crossbeam is a horizontal crossbar for providing a suspension support for the connecting block; the front guide rail and the rear guide rail are two parallel guide rails located at the front and rear positions on the bottom surface of the crossbeam, respectively, and the front guide rail and the rear guide rail cooperate with the slider to achieve lateral movements of the connecting block on the crossbeam, where the connection block also suspends from the crossbeam through mating with the sliders; the connecting block is used to connect the crossbeam with the lifting device, and drives the movement of the lifting device through its own sliding; the first linear motor is a drive mechanism of the connecting block for driving the connecting block to move along the first direction parallel to the crossbeam, i.e., the x-axis direction, with the first primary fixedly connected to the bottom surface of the crossbeam, the length being the same as that of the crossbeam, and the first secondary fixedly connected to the top surface of the connecting block, and the bottom surface of the crossbeam and the top surface of the connecting block are only connected by rails and sliders, without contact between exterior of the two guide rails (front and rear guide rails) and areas between the guide rails, the first secondary moves linearly along the first primary under the action of electromagnetic force to drive the connecting block to move left and right along the first direction (x-axis direction).

If the first linear motor is installed on one side of the front guide rail and the rear guide rail, the support point of the connecting block suspended on the top surface is only on one side. Over time and with the heavy weight of the lifting device with the printhead holder suspended, it will pull down the side of the connecting block without being connected to the rail and cause the connecting block to tilt, affecting the accuracy of inkjet printing of the printer. Therefore, in the present application, the front guide rail and the rear guide rail are located on both sides of the linear motor respectively, that is, the connecting block is located between the front guide rail and the rear guide rail, and the contact point where the connecting block is suspended from the rails is near the front and rear edges of the top surface. In this way, the top surface of the connecting block and the bottom surface of the crossbeam are parallel and both are in the horizontal position, so that the front and rear distance of the inkjet point is consistent with the target distance to ensure the accuracy of inkjet printing.

With respect to the drive structure along the second direction, the left guide rail and the right guide rail are perpendicular to the crossbeam and parallel to each other, and the second slider slides in contact with the left guide rail and right guide rail. The second drive mechanism can be located inside or outside of the two rails (left and right rails) for driving the connecting block to move back and forth along a second direction (y-axis direction) perpendicular to the crossbeam. The bottom surface of the connecting block connects the lifting device with the printhead bracket, so that the printhead bracket can be driven to move along the y-axis direction. Optionally, the second drive mechanism may be driven by a linear motor or motor screw etc.

With respect to the drive structure along the third direction, the inner frame is a rectangular frame connected with the printhead bracket at the bottom, and the outer frame is a rectangular frame fitted over the inner frame; the lifting mechanism is a structure connecting the inner frame and the outer frame, located on both sides of the inner frame, and the inner frame moves up and down relative to the outer frame through the lifting mechanism. Optionally, the lifting mechanism may be screw lifting, rail slide lifting, scissors lifting, etc.; the synchronizing mechanism synchronously transmits the movement of the lifting mechanism on one side to the lifting mechanism on the other side so that the lifting mechanisms on both sides move up and down at the same time. Optionally, it may be a combination of shafts and gears, chains and gears, etc.; the third drive mechanism may be a motor or manual adjusting knob.

During normal power-on use of the printer, the motor drives the components of the lifting mechanism on the same side, and the driven lifting mechanism synchronously drives the lifting mechanism on the other side through the synchronizing mechanism, so that the lifting mechanisms on both sides operate simultaneously and the inner frame moves up and down relative to the outer frame through the lifting mechanism, thereby driving the printhead holder connected to the inner frame to move up and down along the z-axis. When a fault or other emergency occurs, the components of the lifting mechanism on the same side can be driven by the user through the hand crank to allow operation of the lifting device.

In the present invention, use of servo motors for driving will cause wear and tear between belts and pulleys, belts and connecting blocks after long-term use. However, the use of linear motors for driving makes the sliders only contact with rails as the connecting block moves left and right, while the bottom surface of the crossbeam and the top surface of the connecting block are non-contact connections without wear and tear, thereby reducing maintenance costs and labor for maintenance. Furthermore, in this invention, by arranging the linear motor in the position between the front guide rail and the rear guide rail, the contact points of the connecting block suspended on the crossbeam are distributed on the front and back sides of the top surface, ensuring no tilt of the printhead carriage and ensuring inkjet accuracy during long-term use.

In addition, since the left and right guide rails are disposed on the bottom surface of the connecting block instead of the side surfaces, the position of the guide rails is closer to the center position of the connecting block, that is, the corresponding matching slider is closer to the center position of the outer frame, so that the lifting device with the printhead bracket is more stable during movement.

Also, if the lifting mechanism is arranged only on one side of the inner frame, then only one side of the inner frame is driven relative to the outer frame, and there is no driving force acting on the side without the lifting mechanism, which is likely to cause the inner frame to tilt. In addition, if no synchronizing mechanism is set to synchronously drive the lifting mechanisms on both sides of the inner frame, but is driven separately, it is possible to make the inner frame to tilt due to different lifting speeds. Therefore, lifting mechanisms are arranged on both sides of the inner frame in the present invention, and the two are synchronously driven through the synchronizing mechanism so that the horizontal cross section of the inner frame can be moved up and down parallel to the horizontal plane, thus enabling the printhead bracket no tilting to ensure the printing accuracy of inkjet printhead carriage.

Therefore, the movement of the printhead bracket in three directions of the xyz axes can be simultaneously achieved with the setting of the first drive mechanism, the second drive mechanism and the third drive mechanism according to the present invention.

According to a preferably embodiment of the present invention, the connecting block particularly has a suspension area and a motor mounting area located side by side along a length direction of the crossbeam, the first sliders include a plurality of spaced first unit sliders, and a density of the first unit sliders in the motor mounting area is greater than a density of the first unit sliders in the suspension area.

The suspension area is the area where the lifting device with the printhead bracket is suspended, and the motor mounting area is the area where the secondary of the first linear motor is installed, Ff the first secondary is installed in the suspension area, it will cause uneven force on the first slider in the suspension area and thus make the printhead carriage tilt, affecting inkjet accuracy. To solve this problem, part of the area needs to be extended in the suspension area for mounting the first secondary of the first linear motor, and the first secondary also needs to be mounted between the front guide rail and the rear guide rail, so as to correspond to the position of the first primary on the crossbeam. Therefore, the suspension area and the motor mounting area are arranged side by side along the length direction of the crossbeam, that is, the motor mounting area on the connecting block is set to the left or right of the suspension area.

More preferable, the left guide rail and the right guide rail are symmetrical about a center axis of the suspension area extending along the second direction.

In this embodiment, the suspension area is the force-bearing portion where the connecting block is suspended with the lifting device, and the connecting block and the lifting device are connected by matching the left guide rail and the right guide rail with the second slider respectively. Therefore, the symmetrical distribution of the left guide rail and the right guide rail is beneficial to evenly distribute the force of the lifting device and improve stability in movement along the second direction.

More particularly, the second slider includes a plurality of equidistantly spaced second unit sliders.

In such configuration, the second slider in form of multiple second unit sliders can save materials, and the second unit sliders with equidistantly spaced corresponding to each rail is beneficial to evenly distribute the force when the lifting device is suspended. Particularly, the number of the second unit sliders corresponding to the left guide rail and the right guide rail are the same, for example, there are three second unit sliders corresponding to the left guide rail, and three second unit sliders corresponding to the right guide rail.

According to a preferably embodiment of the present invention, the second drive mechanism includes a second linear motor disposed outside the left guide rail and the right guide rail, wherein a second primary of the second linear motor is connected to the bottom surface of the connecting block, and a second secondary of the second linear motor is connected to the outer frame.

In this technical solution, compared with electric motor and belt or chain rail driving and other driving methods, driving with linear motors can avoid friction between the connecting block and the outer frame, reduce the probability of damage, increase service life, and lower maintenance costs.

Additionally or alternatively, the second drive mechanism further includes two sets of second screw assemblies disposed between the left guide rail and the right guide rail, each set of second screw assembly has a second motor, a second screw and a second nut sleeved on the second screw, an output end of each second motor is connected to the respective second screw, and an extension block is sleeved on the second nut, through which the second nut is connected to the outer frame.

In such configuration, the two sets of second screw assemblies are symmetrical about the center axis of the connecting block, which are closer to the center position of the connecting block between the left guide rail and the right guide rail, and the extension block connected to the outer frame is also closer to the center position of the outer frame, making the lifting device move more smoothly along the second direction. In the operation process, linear motors or motors of the second screw assemblies can be selected to provide more options during use.

According to a preferable embodiment of the present invention, the inner frame includes four L-shaped vertical rods fixedly connected with first vertical plates at front and rear sides thereof and second vertical plates at left and right sides thereof; the outer frame includes an outer frame top panel, third vertical plates fixed at front and rear sides of the outer frame top panel, and fourth vertical plates fixed at left and right sides of the outer frame top panel, wherein the third vertical plates are connected to the fourth vertical plates.

The L-shaped vertical rods distributed at four corners of the inner frame are vertical rods with L-shaped cross sections, the right angles of the L-shaped vertical rods form rectangular corners of the inner frame, the first vertical plates and the second vertical plates are vertical plates connected with the L-shaped vertical rods at both ends, the first vertical plates thus form front and rear sides of the inner frame while the second vertical plates form left and right sides of the inner frame, the third vertical plates form front and rear sides of the outer frame, the fourth vertical plates form left and right sides of the outer frame, and the third vertical plates and fourth vertical plates jointly form the four peripheral sides of the outer frame. Each of the first vertical plates, second vertical plates, third vertical plates and fourth vertical plates may be an integral plate or comprised of multiple plates in several pieces.

More preferably, the third drive mechanism is in form of a third motor or a hand crank, the lifting mechanisms includes sliding components and third screw assemblies disposed bilaterally, each of the third screw assemblies has a third screw and a third nut sleeved on the third screw, one end of each third screw is connected to the third motor or hand crank and the other end fixedly connected onto the fourth vertical plate, each third nut is connected to the second vertical plate. The sliding components may include vertical guide rails and third sliders slidable along the vertical guide rails in contact way.

In such configuration, the third nuts are connected to the inner frame through the second vertical plates at sides, and the third screws are connected to the outer frame through the fourth vertical plates at sides. Therefore, when driven, the third nuts move up and down along the screws, thereby driving vertical motions of the inner frame relative to the outer frame. The screws and nuts lifting setup provides advantages of high transmission efficiency, smooth motion, long service life, high precision, safety and reliability.

The third sliders and vertical guide rails provided between the inner frame and the outer frame constitute the sliding components, wherein the third sliders match the vertical guide rails, the vertical guide rails and third sliders can be connected to outer sides of the first vertical plates, second vertical plates, and of the L-shaped vertical rods, as well as inner sides of the third vertical plates or fourth vertical plates. For example, the vertical guide rails are connected to inner sides of the fourth vertical plates, while the third sliders are disposed at outer sides of the L-shaped vertical rods.

During printing operations, when malfunctions of the third motor occur or other emergency adjustment is needed, the hand crank can be used in lieu of the motor to drive the lifting mechanisms to adjust the lifting of the inner frame, and thus adjust the z-axis position of the printhead bracket, thereby completing the remaining printing operations and avoid the delay of the printing tasks.

Particularly, the synchronizing mechanism according to an embodiment of the present invention includes a transmission shaft and a gearbox, the gearbox has a first output port connected to the transmission shaft, a second output port connected to the motor or hand crank, and a third output port connected to the third screw.

The gearbox establishes connections between the third screws, transmission shaft and the third motor, or between the third screws, transmission shaft and the hand crank. The third motor or hand crank drives the third screw on the same side, while motions of the third screws are then transferred through the gearbox to the transmission shaft, which further delivers the motions to the third screw on the other side for synchronized movements of the third screws bilaterally. Preferably, the gearbox is a reduction gearbox which not only provides motion transmission but also speed reduction for more stable vertical movements of the inner frame.

According to an embodiment of the present invention, at least two gantry frames are fixed on the crossbeam, and inner sides of the gantry frames extend from top to bottom to 40~60% of the side surface height of the crossbeam.

In such configuration, the gantry frames are reinforcing members disposed at both sides of the printer operation zone, with heights of inner sides of the gantry frames accounting for 40% to 60% of heights of sides of the crossbeam. Excessively high inner sides height of the gantry frames would obstruct normal operations of the drag chains, as well as increase material costs; whereas excessively low inner sides height of the gantry frames cannot provide enough reinforcement. Therefore, appropriately sized inner sides not only ensure reinforcing effects of the gantry frames but also avoid operational impacts on other components along the crossbeam, while reducing production costs.

More particularly, three inner sides of each gantry frame are connected to the crossbeam.

In the present embodiment, front and rear inner sides of the gantry frames connect flush against front and rear sides of the crossbeam respectively, while top inner sides of the gantry frames connect flush against top sides of the cross-beam, so that connections through the three sides make the gantry frames sturdier.

Additionally, both ends of horizontal rods of the gantry frames have extending portions forming "L" shapes with longitudinal rods of the gantry frames.

In such configuration, the extending portions are parts of the horizontal rods of the gantry frames protruding beyond the longitudinal rods, wherein an "L" shaped notch, formed between bottom sides of the extending portions and a side of the longitudinal rod, serves to fix printer pillars, such that top sides of the pillars connect to bottom sides of the extending portions, while sides of the pillars connect to sides of the longitudinal rods.

Compared to conventional printers, pillars of the printer according to the present invention are arranged at the front and rear sides of the existing operation zone, instead of adding to printer lengths bilaterally, wherein reasonable use has been made of ample width-wise space to reduce printer length and occupied space; and ample operation space is afforded at both sides of the printer for easier maintenance and troubleshooting, which would have been hindered by bilaterally disposed pillars.

In addition, a drag chain carrier and a drag chain disposed above the drag chain carrier are connected to one side of the crossbeam according to an embodiment of the present invention, wherein the drag chain carrier is arranged along the length direction of the crossbeam, a fixed end of the drag chain is located at midsection of the crossbeam while a free end thereof is connected to the connecting block.

In the present technical solution, the drag chain protects lines and cables thereof against damage, the drag chain carrier fixes the drag chain in place, and a length-wise side of the drag chain carrier is connected to the side of the crossbeam; placing the fixed end of the drag chain at midsection of the crossbeam can reduce its required length, as compared to placing it at an end of the crossbeam which requires its length to match that of the crossbeam, hence increasing material costs. Preferably, the fixed end of the drag chain can be fixedly connected to the crossbeam or the drag chain carrier; the moving end of the drag chain moves accordingly as the connecting block repositions.

More preferably, supporting rollers may be arranged between a midsection and a right end of the crossbeam and fixed to sides thereof, the height of the support rollers relative to the drag chain carrier is 20%~30% of the height of the crossbeam. The moving end of the drag chain is connected to the connecting block through a suspension in a "C" shape with two horizontal portions perpendicularly connecting with a vertical portion, and the drag chain's moving end is connected to the horizontal portion, distal from the connecting block, of the suspension which is higher than and longer than the supporting rollers.

In the present technical solution, the supporting rollers are parts supporting the drag chain, an excessively high support roller would arch up the drag chain and increase its length requirement, while too short would undermine its support function, therefore a suitable height keeps the drag chain in place without needing extra length. In addition, no support rollers are disposed between midsection and the left end of the crossbeam, as the drag chain would directly lie on the drag chain carrier when its moving end is left of the fixed end, support rollers would likely cause folding of the drag chain when the moving end thereof moves back from the far right, thereby affecting cable lifespan. Moreover, during printer non-operating times when the connecting block docks at the right end of the crossbeam, the support rollers then hold up the drag chain to reduce bending parts thereof, to better protect the cables against damage.

In the suspension, the horizontal side at the top thereof connects to the moving end of the drag chain, while the bottom horizontal side connects to the connecting block to achieve connection between the drag chain and the connect-ing block. The horizontal side distal from the connecting block remains higher than and longer than the support roller, so that as the drag chain moves, its moving end consistently stays above the fixed end and the support rollers without risk of the suspension being blocked by the support rollers, thereby ensuring normal printer operations.

According to a preferable of the present invention, the crossbeam has an internal cavity divided by a partition plate into two cavities, a reinforcing rib is connected to the inner wall of each cavity.

In such configuration, the hollow design of the crossbeam saves materials, and the strengthening ribs prevent defor-mation of the crossbeam. The partition plate not only separates the cavity into two cavities but also reinforces the shape of the crossbeam. In addition, after separation into two cavities, the length of the reinforcing ribs becomes shorter and less prone to bending and deformation, thereby better maintaining the shape of the crossbeam and hence inkjet precision.

The ends of the crossbeam may have end plates according to the present invention, a dust shield cover is disposed below the crossbeam with one end connected to the end plates and the other end connected to the connecting block for covering at least the first primary and first guide rails.

The dust shield cover may be a stretchable shielding cover, for preventing dust buildup on the crossbeam bottom and connected parts, including areas other than those con-nected between the crossbeam bottom and connecting block; and the end plates seal off openings of the internal cavities of the crossbeam while also fixing the dust shield cover. Two dust shield covers are preferably connected bilaterally to the connecting block, such that as the connecting block moves left, the left shield cover shrinks while the right one stretches, and vice versa.

In comparison with existing art, some beneficial effects of the present invention can be obtained.

(1) The printhead in the present invention is driven along the first direction (x-axis) by the first linear motor, with bottom of the crossbeam and top of the connecting block only connect through guide rails and sliders and without contact at intermediate and external parts of the guide rails, thereby avoiding wear due to prolonged use, reducing main-tenance costs and labor.

(2) The printhead in the present invention is movable along three axes x, y, and z, allowing the printhead posi-tioning more adjustable.

(3) The inkjet printing device of the invention can choose the second linear motor or the motor of the second screw assembly for driving in the second direction (y-axis), and the second screw assembly is symmetrically set between the left guide rail and the right guide rail, which is conducive to improving the smoothness of the printhead bracket in the printing process.

(4) The present invention arranges the first linear motor between the front guide rail and rear guide rail so that suspension points of the connection block, distributing at front and rear sides of the top surface, ensure tilt-free positioning of the printhead carriage for sustained inkjet precision over prolonged use.

(5) The hollow interior design of the crossbeam and the arrangement of internal strengthening ribs prevents crossbeam deformation, as well as achieve production materials savings and reduced production costs for the printer.

(6) The addition of a hand crank enables manual driving of the lifting mechanisms for timely adjustment of carriage positions along the third direction (z-axis) upon printhead carriage failures or other emergency situations, thereby allowing more flexible printhead carriage positioning while avoiding delays in printing jobs.

DETAILED DESCRIPTION OF THE PREFERRED EMBODIMENTS

Figure 1:
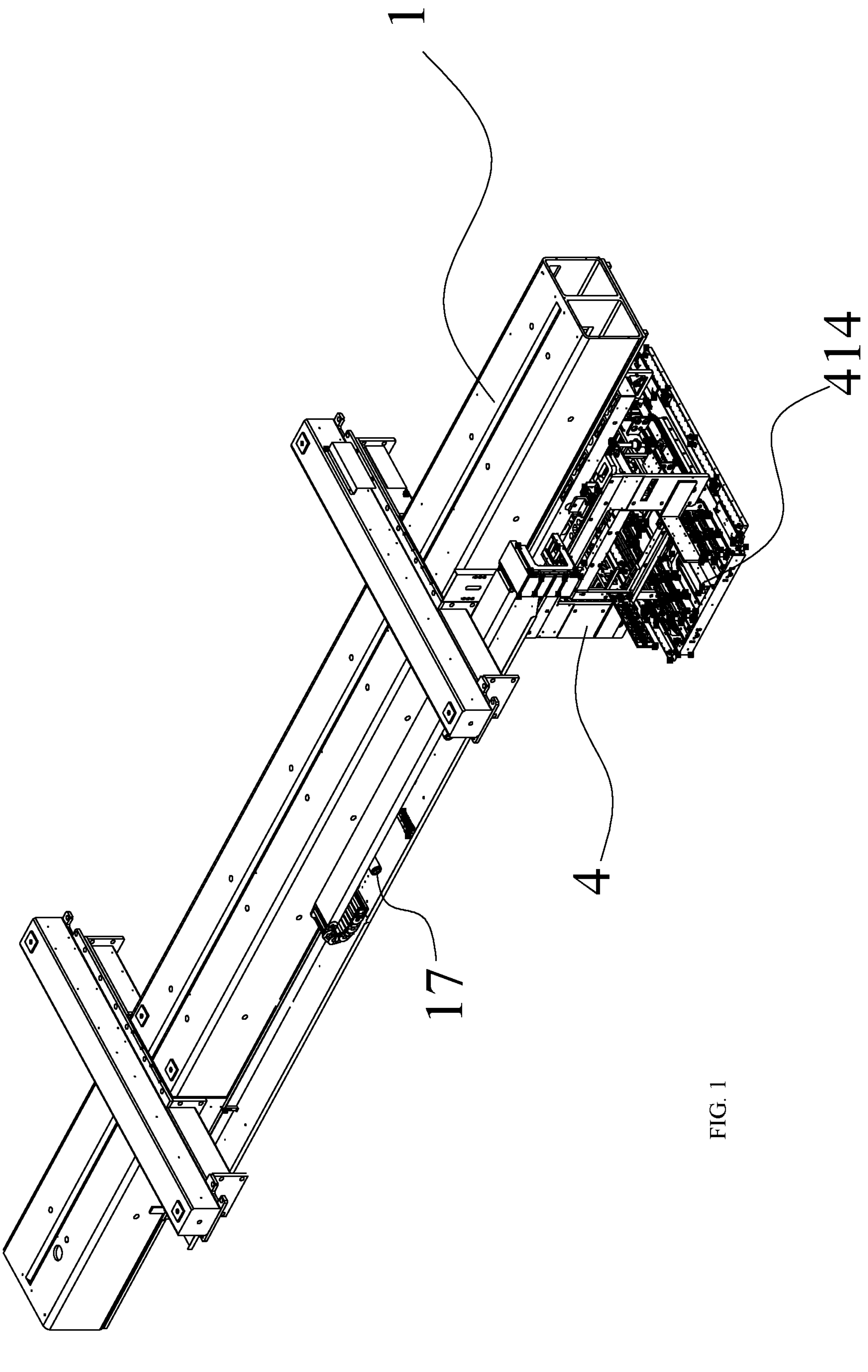
FIG. 1 is an overall schematic view of the inkjet printing structure according to an embodiment of the present invention.

The drawings of the present invention are only used for exemplary illustration and should not be construed as limiting the invention. In order to better illustrate the following embodiments, some parts of the drawings may be omitted, enlarged or reduced, and do not represent the actual size of the product. For those skilled in the art, certain known structures and descriptions in the drawings may be omitted.

FIG. 1 depicts an inkjet printing structure according to an embodiment of the present invention.

First, referring to FIGS. 2 to 7, the structure of motion along the first direction will be described.

The inkjet printing structure according to the present embodiment includes a crossbeam 1, a connecting block 2, and a first driving mechanism. Underneath the crossbeam 1 a front guide rail 11 and a rear guide rail 12 along the length direction of the crossbeam 1 are provided, which are connected to the crossbeam 1 (specifically shown in FIG. 4). The connecting block 2 is mounted with a first slider 21 cooperating with the front guide rail 11 and the rear guide rail 12 (specifically shown in FIG. 7). The first driving mechanism is disposed between the crossbeam 1 and the connecting block 2, and includes a first linear motor for driving the connecting block 2 to reciprocate left and right, namely moving along the length direction of the crossbeam 1. The first linear motor is disposed between the front guide rail 11 and the rear guide rail 12, a first primary of the first linear motor is fixedly connected to the bottom surface of the crossbeam 1, and a first secondary 3 of the first linear motor is fixedly connected to the top surface of the connecting block 2.

Figure 3:
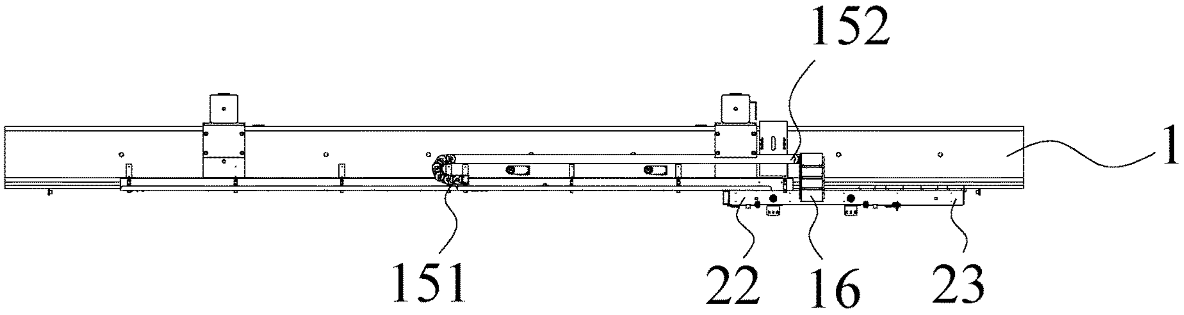
FIG. 3 is a front view of the crossbeam and the connecting block of FIG. 1.
Figure 6:
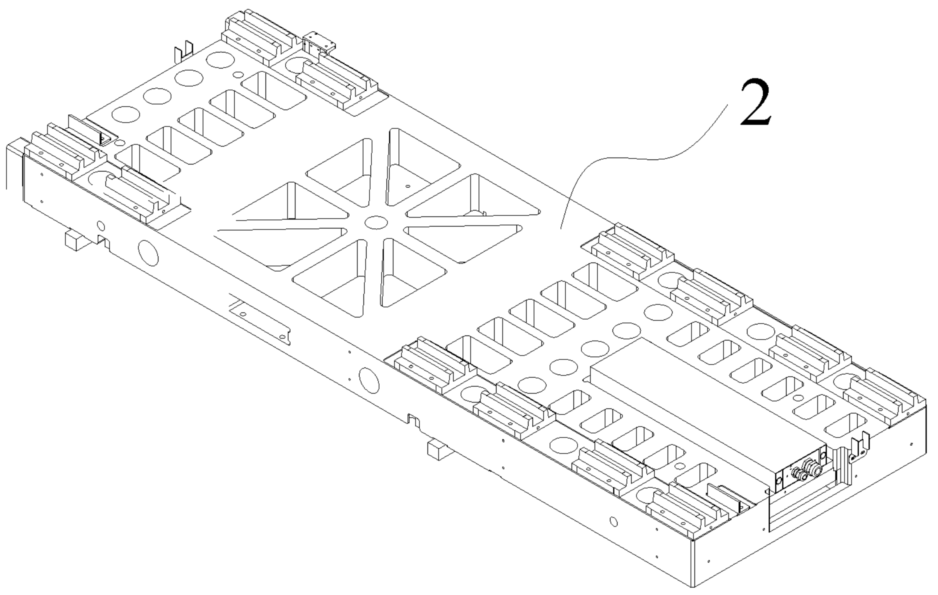
FIG. 6 is a perspective view of the connecting block of FIG. 1.
Figure 7:
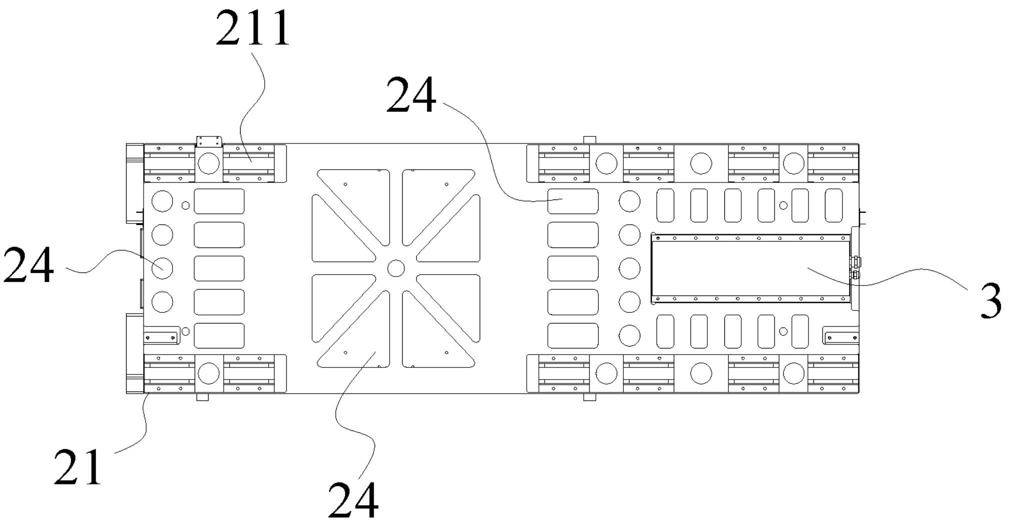
FIG. 7 is a top view of the connecting block of FIG. 1.

In combination with FIG. 3, FIG. 6 and FIG. 7, the connecting block 2 includes a suspension area 22 and a motor mounting area 23 arranged side by side along the length direction of the crossbeam 1. The first slider 21 includes multiple spaced first unit sliders 211. The density of the first unit sliders 211 in the motor mounting area 23 is greater than the density of the first unit sliders 211 in the suspension area 22. For example, as shown in FIGS. 6 and 7, the suspension area 22 is installed with four first unit sliders 211, and the front guide rail 11 and rear guide rail 12 each are distributed two first unit sliders 211 respectively; while the motor mounting area 23 has eight first unit sliders 211, and the front guide rail 11 and rear guide rail 12 each are distributed four first unit sliders 211 respectively.

The connecting block 2 is also provided with several recesses 24 to achieve weight reduction and material saving. The recesses 24 maybe square, circular, triangular, or any other suitable shape.

Figure 2:
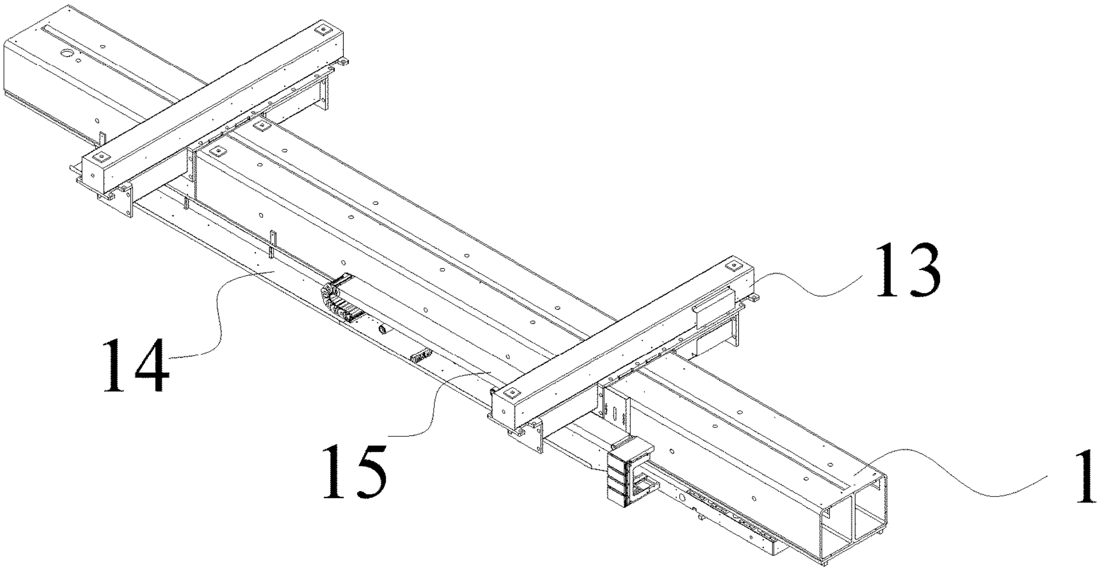
FIG. 2 is a perspective view of the crossbeam and the connecting block of FIG. 1.
Figure 4:
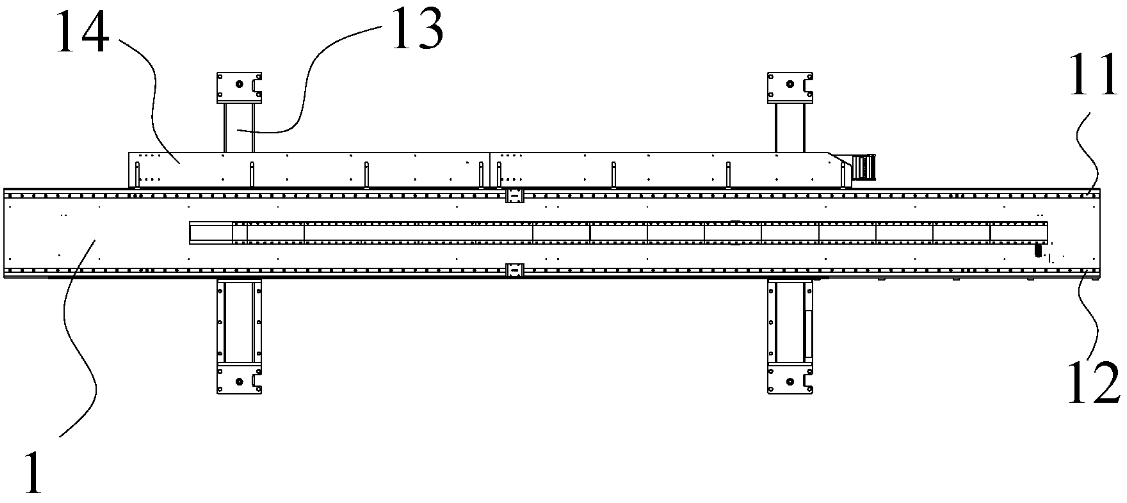
FIG. 4 is a bottom view of the crossbeam of FIG. 1.
Figure 5:
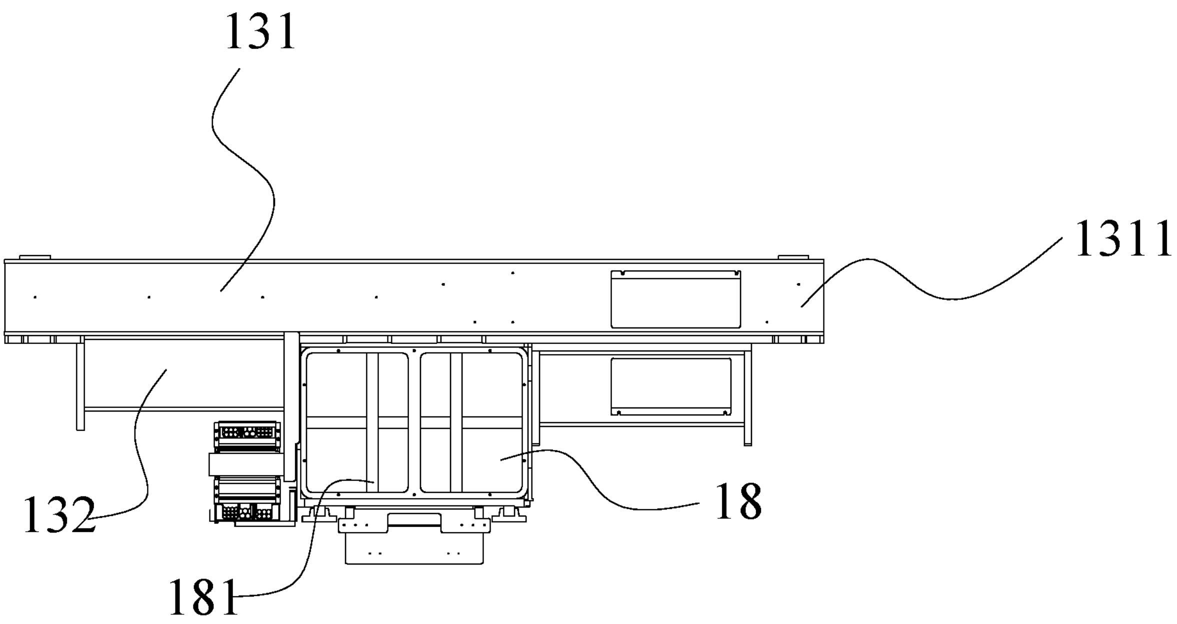
FIG. 5 is a left view of the crossbeam and the connecting block of FIG. 1.

At least two gantry frames 13 are fixed on the crossbeam 1, and the inner side surfaces of the gantry frames 13 extend to 40-60% of the side surface height of the crossbeam 1 from top to bottom. Preferably, as shown in FIG. 2 and FIG. 4, there is one gantry frame 13 on each side of the printer's printing work area, and the inner side surfaces of the gantry frames 13 extend to 30% of the side surface height of the crossbeam 1 from top to bottom. As FIG. 5 shown, both ends of the horizontal rods 131 of each of the gantry frames 13 have extending portions 1311 forming "L" shapes with longitudinal rods 132 of the gantry frames 13. Three inner sides of each gantry frame 13 are connected to the cross-beam 1.

In combination with FIGS. 1-3, a drag chain carrier 14 and a drag chain 15 disposed above the drag chain carrier 14 are further connected to a side of the crossbeam 1. The drag chain carrier 14 is arranged along the length direction of the crossbeam 1. A fixed end 151 of the drag chain 15 is located at a middle part of the crossbeam 1 and a moving end 152 of the drag chain 15 is connected to the connecting block 2. Preferably, the fixed end 151 of the drag chain 15 is fixed onto the drag chain carrier 14 which is in a rectangular plate. A supporting roller 17 is arranged between a middle part and a right end (end close to the connecting block 2) of the crossbeam 1 and fixed to sides thereof, the height of the supporting rollers 17 relative to the drag chain carrier 14 accounts for 20%~30% of the height of the crossbeam 1. Preferably, there are two supporting rollers 17 with heights accounting for 20% of the height of the crossbeam 1 relative to the drag chain carrier 14. The moving end 152 of the drag chain 15 is connected to the connecting block 2 through a suspension 16 in a "C" shape, which has two horizontal portions and a vertical portion perpendicularly connected to the horizontal portions, the moving end 152 of the drag chain 15 connected to the horizontal portion, distal from the connecting block 2, of the suspension 16, which horizontal side is higher than and longer than the supporting rollers 17.

FIG. 5 depicts that the crossbeam 1 has an internal cavity divided by a partition plate into two cavities 18, inner walls of each cavity 18 are connected with strengthening ribs 181 in transverse and longitudinal spacings forming a "+" shaped structure in left or right view. The ends of the crossbeam 1 have end plates (not shown), a dust shield cover (not shown) is provided below the crossbeam 1 with one end connected to the end plates and the other end connected to the connecting block 2 for covering at least the first primary and the guide rails. Preferably, two dust shield covers are connected bilaterally to the connecting block 2, so that as the connecting block 2 moves left, the left dust shield cover shrinks while the right one stretches, and vice versa when moving right.

In operation, the first linear motor drives lateral reciprocal motions of the connecting block 2 with its first primary fixed to the bottom surface of the crossbeam 1, spanning the same length as the crossbeam 1, the first secondary 3 fixed to the top surface of the connecting block 2 moving linearly along the first primary under electromagnetic forces, thereby driving lateral motions of the connecting block 2 along the length direction of the crossbeam 1.

Next, referring to FIGS. 8 to 15, the structure for movement along the third direction will be described.

Figure 12:
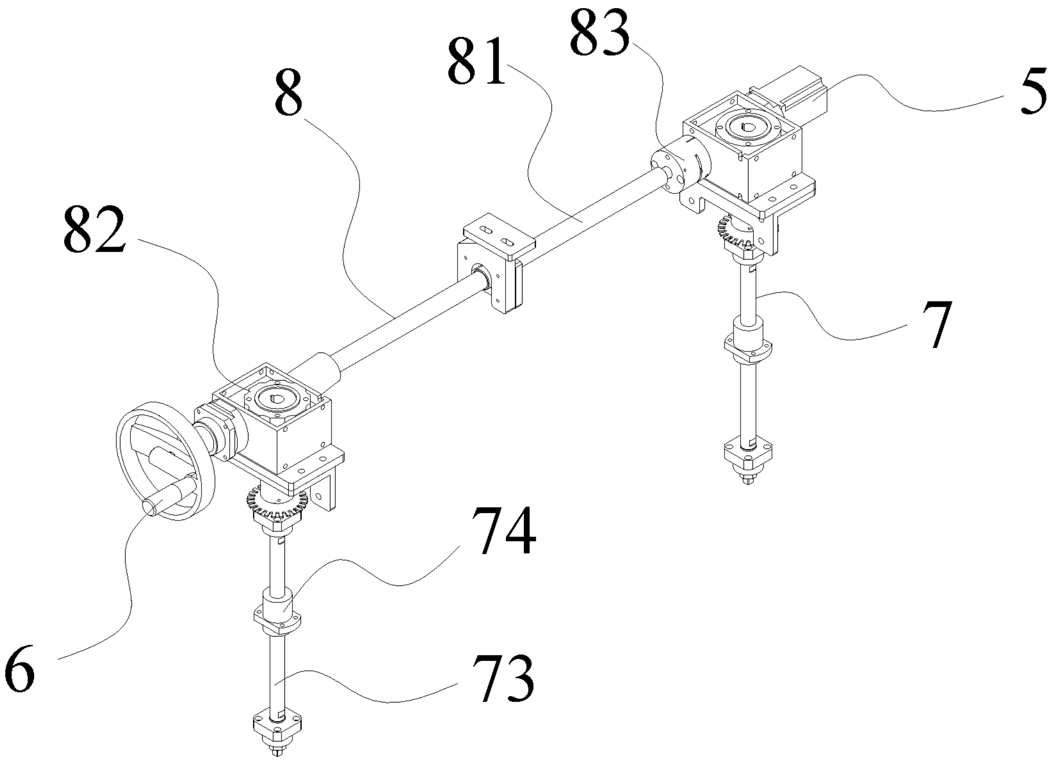
FIG. 12 is a schematic view showing the structure of the third drive mechanism, synchronizing mechanism and third screw assembly according to an embodiment of the present invention.
Figure 13:
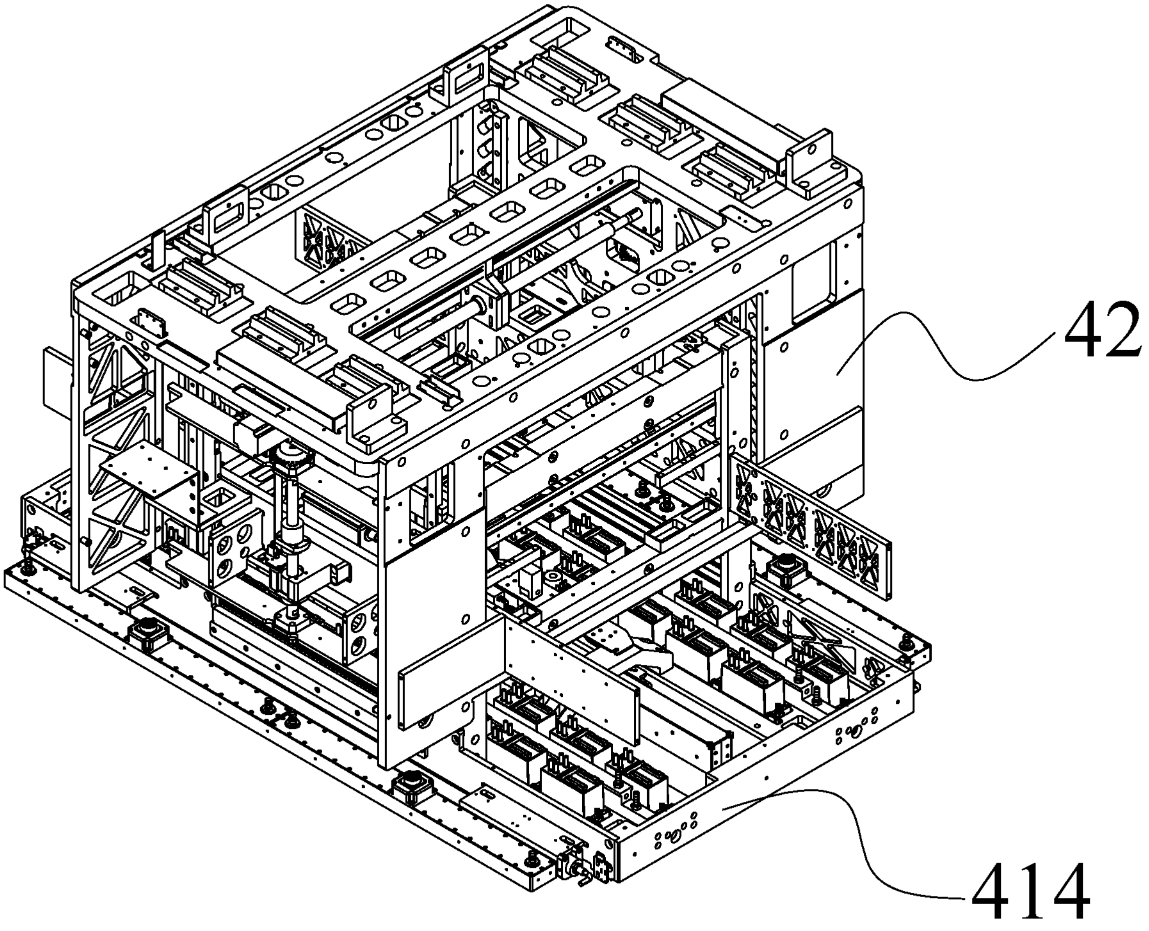
FIG. 13 is a schematic view showing the structure of the lifting device with printhead bracket according to an embodiment of the present invention.

Turning to FIG. 1, the inkjet printing structure further provides a lifting device 4, including an inner frame 41, an outer frame 42, a third drive mechanism, lifting mechanisms 7 and a synchronizing mechanism 8, wherein the third drive mechanism is a third motor 5 or a hand crank 6 (shown in FIG. 12). The inner frame 41 is used to connect a printhead bracket 414, and the lower end face of the printhead bracket 414 is provided with a plurality of lamp bases 4141 along the direction of the fourth vertical plate 423 (shown in FIG. 15). The inner frame 41 moves relative to the outer frame 42 via the lifting mechanisms 7 at bilateral sides. With reference to FIG. 12, the synchronizing mechanism 8 synchronizes the lifting mechanisms 7 at both sides. The third motor 5 is connected to one end of the synchronizing mechanism 8, and the hand crank 6 is connected to the other end of the synchronizing mechanism 8. The third motor 5 or the hand crank 6 drives the lifting mechanisms 7 at both sides in synchronization through the synchronizing mechanism 8.

Figure 8:
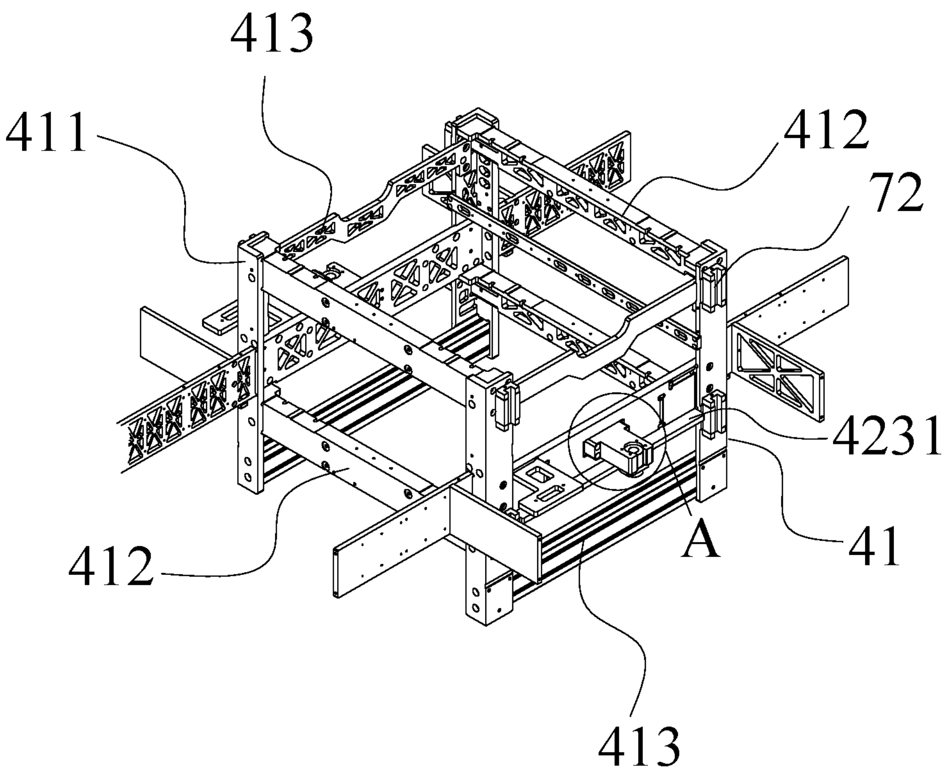
FIG. 8 is a schematic view showing the structure of the inner frame according to an embodiment of the present invention.
Figure 10:
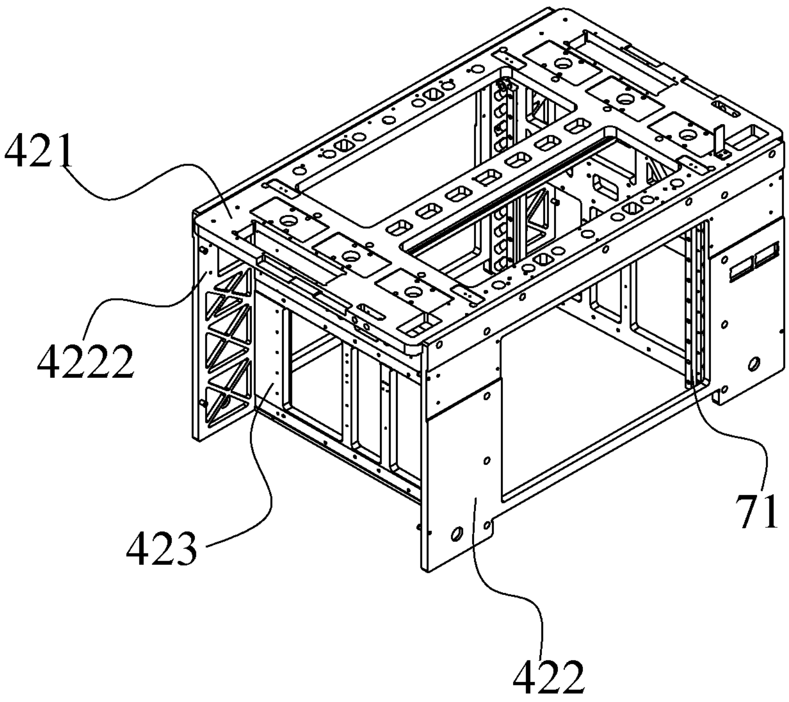
FIG. 10 is a schematic view showing the structure of the outer frame of according to an embodiment of the present invention.

Specifically, the inner frame 41 has four L-shaped vertical rods 411 fixedly connected with first vertical plates 412 at front and rear sides thereof and second vertical plates 413 at left and right sides thereof, as shown in FIG. 8. The outer frame 42 has an outer frame top panel 421, third vertical plates 422 fixed to front and rear sides of the outer frame top panel 421, and fourth vertical plates 423 fixed to left and right sides of the outer frame top panel 421, as shown in FIG. 10. The third vertical plates 422 and fourth vertical plates 423 are connected. The L-shaped rods 411 have an L-shaped cross section. The first vertical plates 412 includes two connecting plates spaced apart from top to bottom. The second vertical plates 413 include three spaced connecting plates. The third vertical plates 422 are two square frames. The fourth vertical plates 423 are hollow vertical plates, such hollow design provides space for protruding portions of components inside the outer frame 42, while also saving material and reducing weight.

Figure 11:
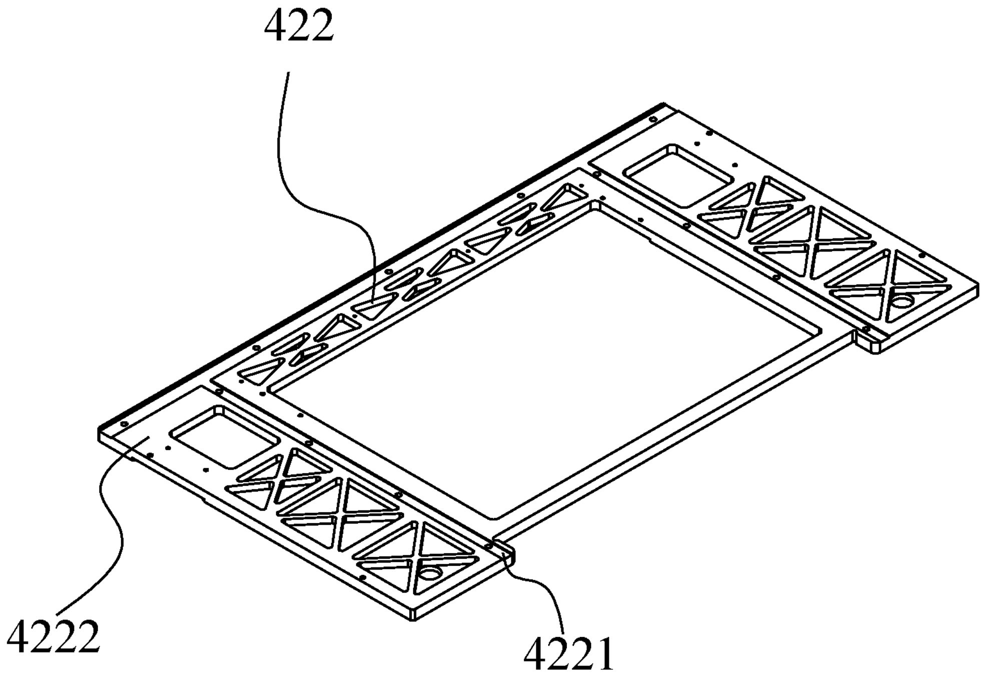
FIG. 11 is a schematic view showing the structure of the third vertical plate of FIG. 10.
Figure 14:
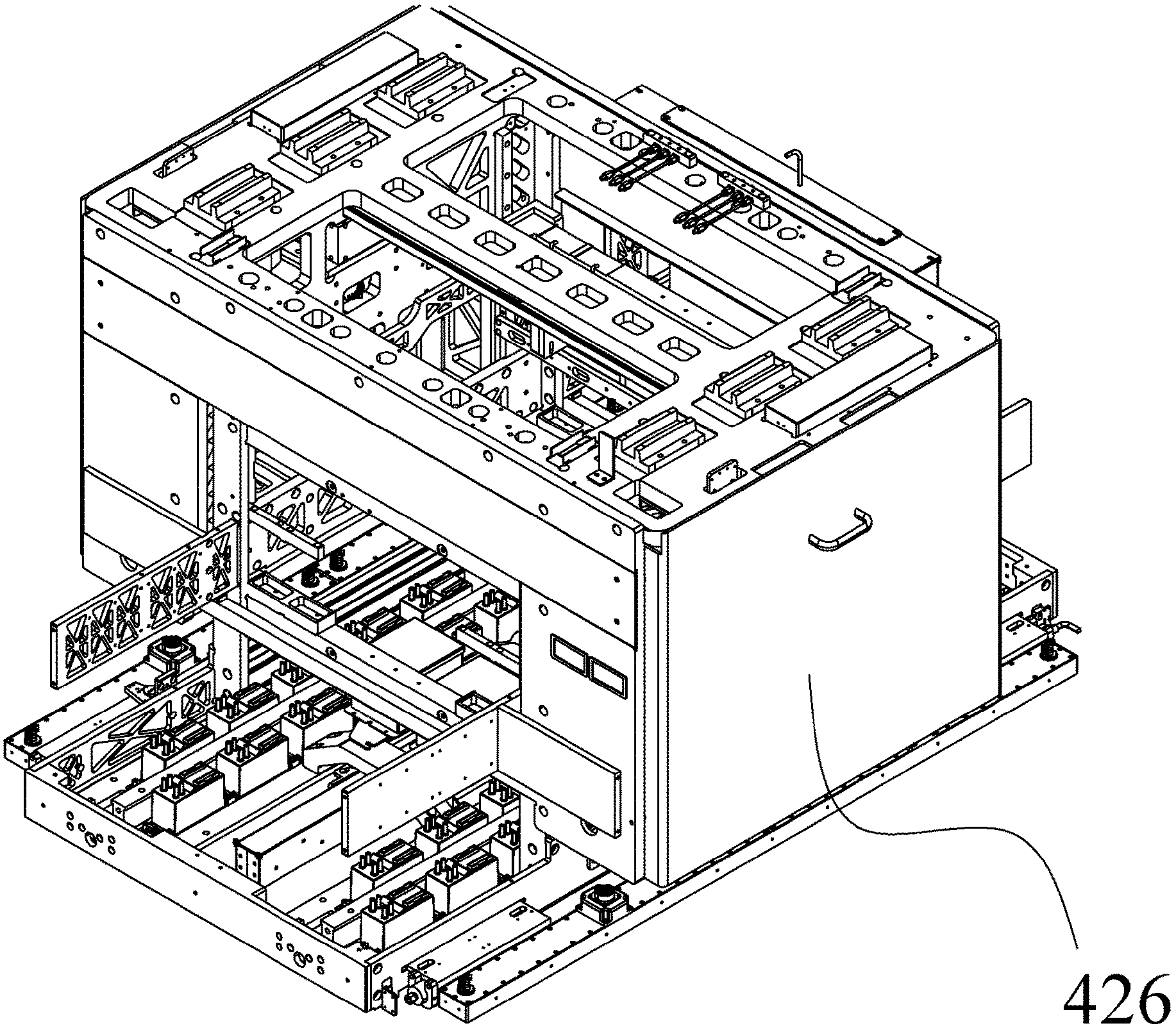
FIG. 14 is a schematic view showing the structure of the protective plate according to an embodiment of the present invention.
Figure 15:
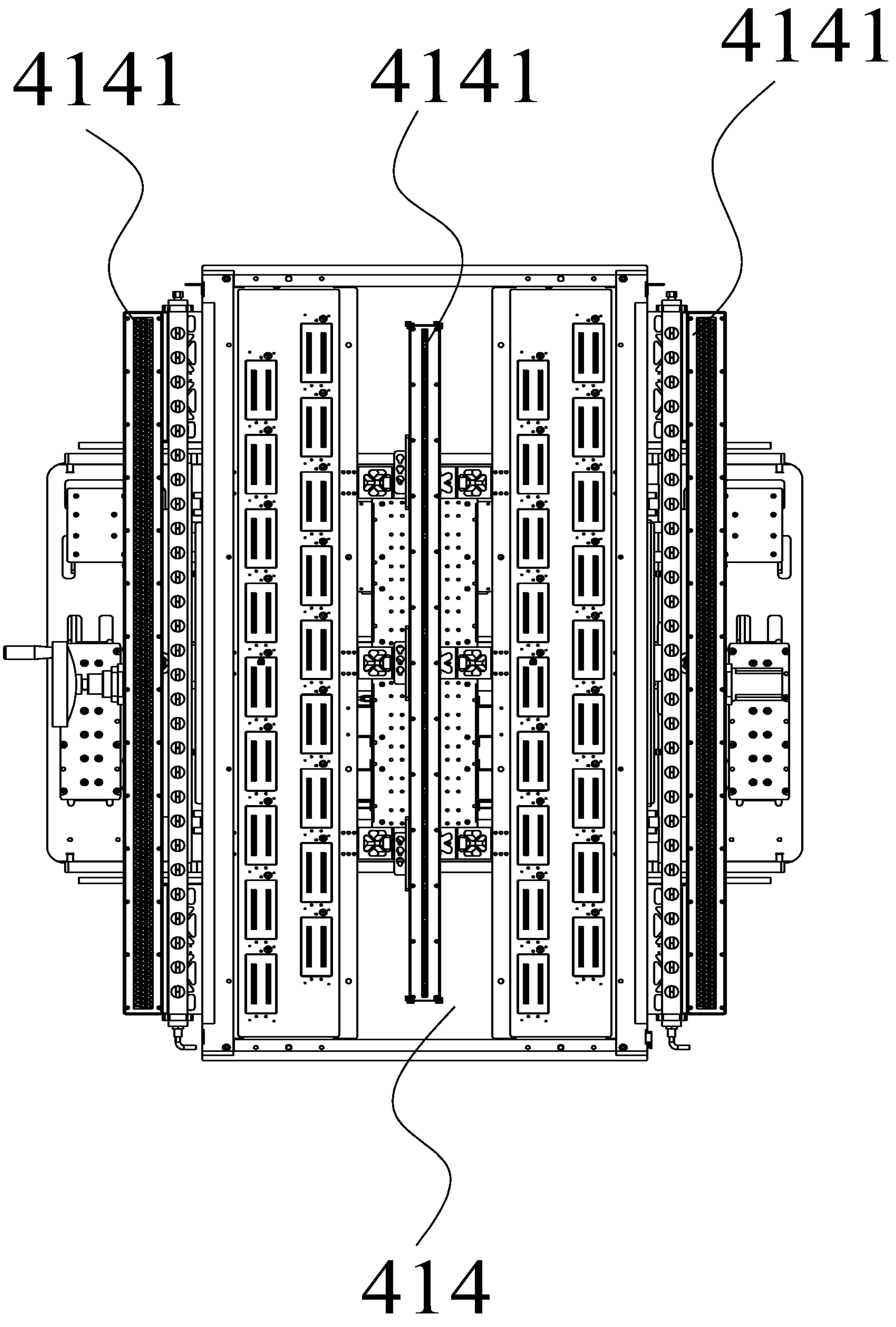
FIG. 15 is a bottom view of the lifting device with printhead bracket of FIG. 13.

Further in combination with FIG. 11 and FIG. 14, the third vertical plates 422 are totally provided with four mutually parallel vertical grooves 4221. The fourth vertical plates 423 are embedded in the grooves 4221. Each third vertical plate 422 is provided with an extending plate 4222 to the outside of the groove 4221, and the extending plate 4222 is fixedly connected to the protective plate 426 further connected to the outer frame top panel 421.

Referring now to FIG. 12, the lifting mechanisms 7 particularly includes sliding components and third screw assemblies bilaterally disposed, each of the third screw assemblies includes a third screw 73 and a third nut 74 sleeved on the third screw 73, wherein one end of each third screw 73 is connected to the third motor 5 or hand crank 6 and the other end is fixed onto the fourth vertical plate 423, each of the third nuts 74 is connected to the second vertical plates 413.

Figure 9:
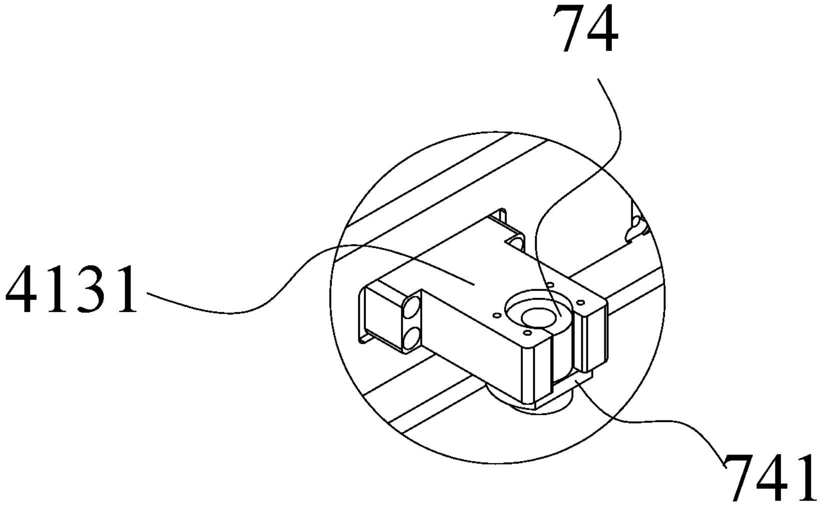
FIG. 9 is a schematic view showing the structure of the extending block according to an embodiment of the present invention.

In combination with FIGS. 8 and 9, the second vertical plates 413 extend laterally outwards with bases 4131 formed with circular grooves, and the third nut 74 is embedded in the circular groove, each of the third nuts 74 are provided with limit rings 741 around the outer periphery thereof, the limit rings 741 abut against lower end surfaces of the bases 4131.

The fourth vertical plates 423 extend laterally outwards with fixing plates 4231 for connection between the third screws 73 and the fourth vertical plates 423. The fixing plates 4231 are T-shaped plates arranged along the fourth vertical plates 423.

Limit switches are provided outside the fourth vertical plates 423 for limiting positions of the third nuts 74, and the lifting devices 4 stop moving up and down when the connecting block 2 touches the limit switches.

The third screw assemblies are also provided with displacement sensors for measuring motion distances of the third nuts 74, wherein the displacement sensors includes rotary encoders and an optical grating detecting device, the rotary encoder includes an encoder disk connected to each of the third screws 73 and encoding sensors connected to outer sides of the fourth vertical plates 423; the optical grating detecting device includes grating rulers connected to the connecting block and optical grating sensors. The rotary encoders are provided on the third screws 73 on both sides for measuring motion distances of both sides of the inner frame 41 so as to determine whether both sides are lifting synchronously based on consistency of the measurements, otherwise adjustment for synchronization is needed before printing operations.

Further in combination with FIGS. 8 and 10, the sliding components especially includes vertical guide rails 71 and third sliders 72 sliding along the vertical guide rails 71 in contact way. The vertical guide rails 71 and third sliders 72 are provided between the inner frame 41 and outer frame 42, wherein the vertical guide rails 71 are vertical guide tracks matching the third sliders 72. The vertical guide rails 71 and third sliders 72 can be connected to outer sides of the first vertical plates 412, second vertical plates 413 and the L-shaped vertical rods 411, as well as inner sides of the third vertical plates 422 and fourth vertical plates 423. For example, the vertical guide rails 71 are connected to inner sides of the fourth vertical plates 423, shown in FIG. 8, and the third sliders 72 are disposed at outer sides of the L-shaped vertical rods 411, shown in FIG. 10.

Referring back to FIG. 12, the synchronizing mechanism 8 includes a transmission shaft 81 and a gearbox 82 connected through a coupling 83, the gearbox 82 has a first output port, a second output port and a third output port, wherein the first output port is connected to the driveshaft 81, the second output port is connected to the third motor 5 or hand crank 6, and the third output port is connected to the third screws 73. The coupling 83 is a rotating member connecting the driveshaft 81 and the gearbox 82. In such configuration, when the third screw assemblies at both sides are not synchronized, the coupling 83 can be removed for adjustment of the third screw assemblies until the inner frame 41 becomes horizontal before printing.

In operation, the motor drives the components of the lifting mechanism 7 on the same side during normal powered operations of the printer, the driven lifting mechanism 7 in turn drives the lifting mechanism 7 on the other side through the synchronizing mechanism 8, so that the lifting mechanisms 7 at both sides operate simultaneously to drive vertical movements of the inner frame 41 relative to outer frame 42, thereby driving the printhead bracket 414 connected to the inner frame 41 in the z-axis direction. In addition, when malfunctions or other emergency situations occur, the components of the lifting mechanism 7 can be driven by the user via the hand crank 6 on the same side to operate the lifting device 4.

Next, referring to FIGS. 16-18, the structure for movement along the second direction will be described.

A left guide rail 25 and a right guide rail 26 are provided at the bottom surface of the connecting block, and second sliders 424 fitting with the left and right guide rails 25, 26 are installed on the outer frame 42, wherein the second sliders 424 includes multiple second unit sliders 4241 equidistantly spaced. As shown in FIG. 17, three second unit sliders 4241 are distributed for the left guide rail 25 and another three second unit sliders 4241 are distributed for the right guide rail 26 in this embodiment;

A second drive mechanism is provided between the connecting block 2 and the lifting device 4 for driving the connecting block 2 to move back and forth along the second direction perpendicular to the length of the crossbeam 1. The second drive mechanism includes a second linear motor located outside the left guide rail 25 and right guide rail 26, with a second primary of the second linear motor connected to the bottom surface of the connecting block, and a second secondary 425 of the second linear motor connected to the outer frame 42.

Figure 16:
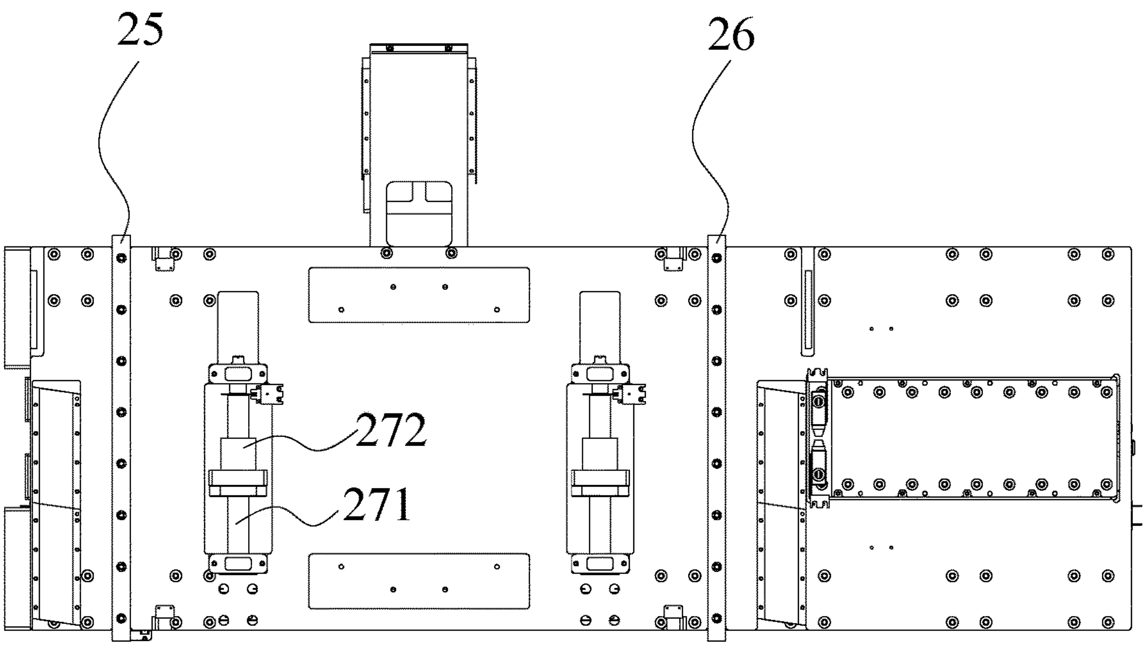
FIG. 16 is a bottom view of the connecting block according to another embodiment of the present invention.
Figure 17:
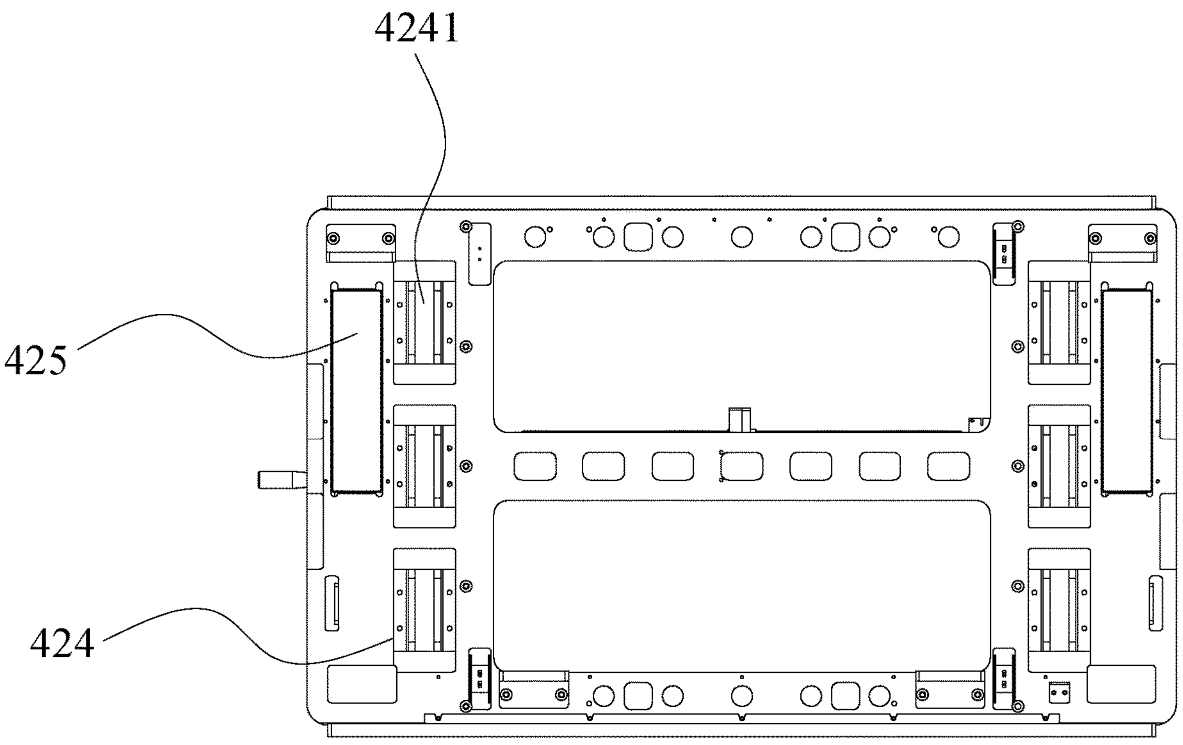
FIG. 17 is a bottom view of the outer frame top panel according to an embodiment of the present invention.
Figure 18:
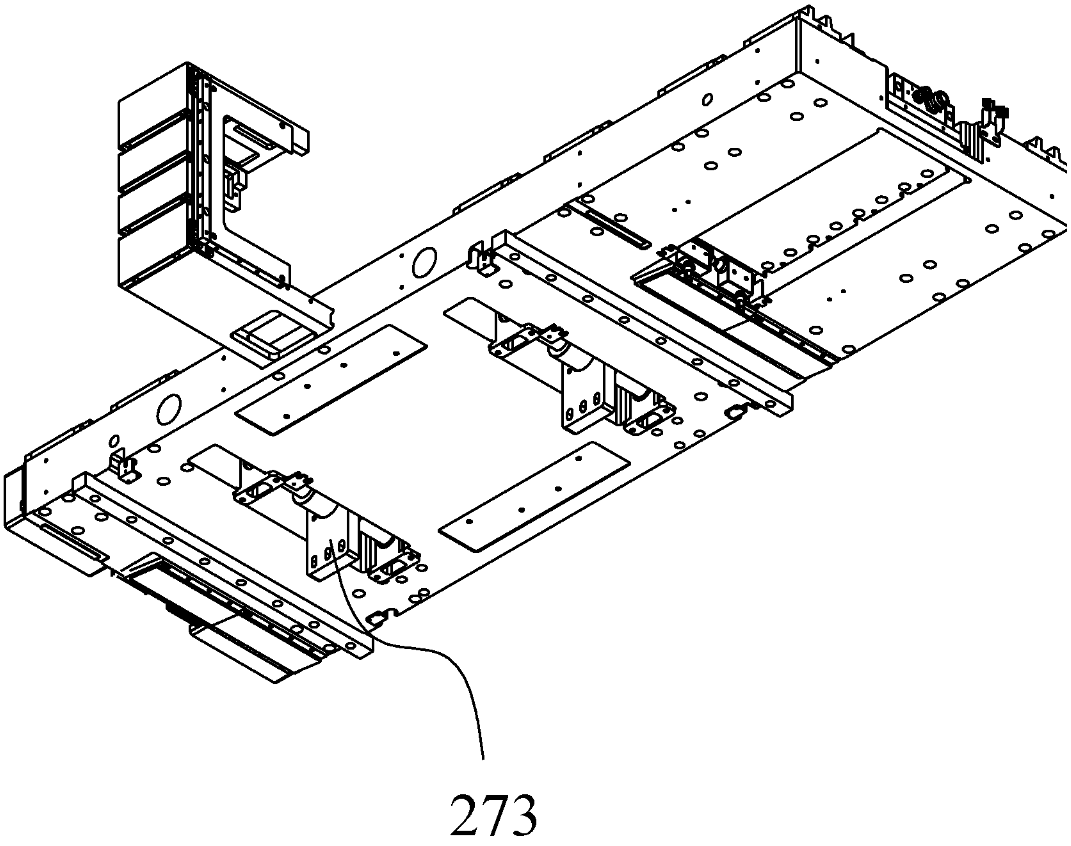
FIG. 18 is a schematic view showing the structure of the extending block according to an embodiment of the present invention.

Further in combination with FIG. 16 and FIG. 18, the second drive mechanism further includes two sets of second screw assemblies disposed between the left guide rail 25 and right guide rail 26, each set of the second screw assemblies comprises a second motor, a second screw 271 and a second nut 272 sleeved on the second screw 271, an output end of each second motor is connected to respective second screw 271, and an extension block 273 is sleeved on the second nut 272, and the second nut 272 is connected to the outer frame 42 through the extension block 273.

In operation, if the second linear motor is selected for driving, the second linear motor drives back and forth movement of the lifting device 4 along the second direction perpendicular to length of the crossbeam 1, and the second secondary 425 moves linearly along the second primary under electromagnetic forces to drive front and rear motions of the inner frame 41 and movements of the printhead bracket 414 along the second direction; if the second screw assemblies are selected for driving, the second motors drive rotations of second screws 271, the second nuts 272 then drive movements of the extension blocks 273 along the second direction, the extension blocks 273 connected to the outer frame 42 in turn drive movements of the lifting device 4 and printhead bracket 414 along the second direction.

Figure 19:
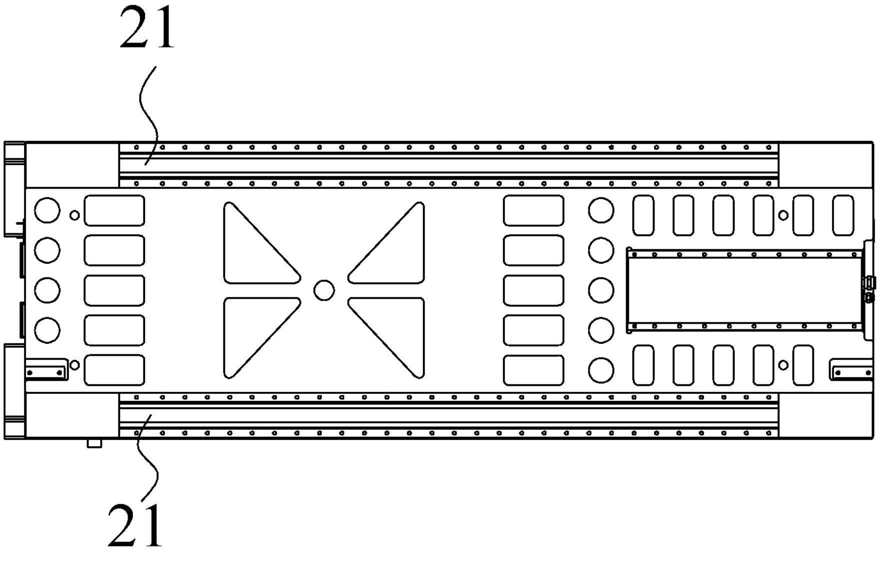
FIG. 19 is a top view of the connecting block according to another embodiment of the present invention.

Referring now to FIG. 19, in another embodiment, two first sliders 21 of the same length are mounted on the connecting block 2, matching the front guide rail 11 and the rear guide rail 12, respectively.

Figure 20:
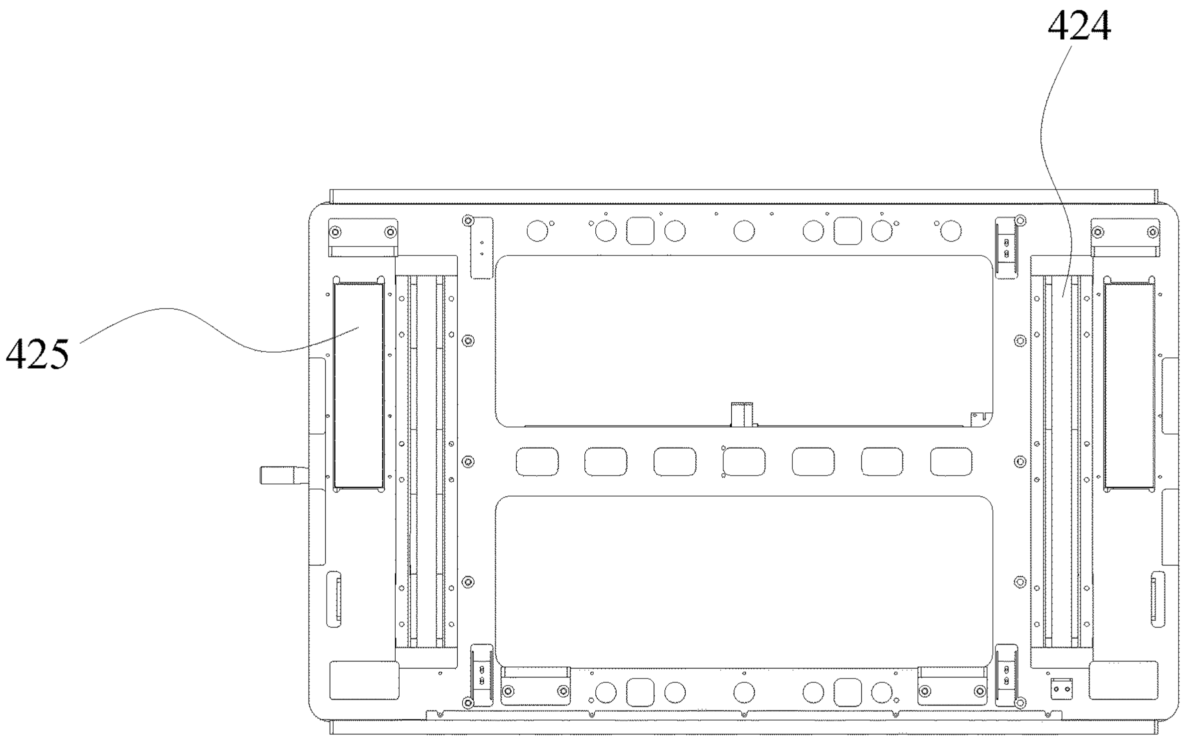
FIG. 20 is a top view of the outer frame top panel according to another embodiment of the present invention.

Referring now to FIG. 20, similarly, two second sliders 424 of the same length are mounted on the outer frame 42 according to another embodiment, matching the left guide rail 25 and the right guide rail 26, respectively.

Obviously, the above embodiments of the invention are merely examples for clearly explaining the technical solutions of the invention, and are not intended to limit the specific implementations of the invention. Any modifications, equivalent replacements, and improvements made within the spirit and principle of the invention claims shall fall within the protection scope of the invention claims.

What is claimed is:

1. An inkjet printing structure comprising:

a crossbeam having a front guide rail and a rear guide rail provided on a bottom surface thereof, with the front guide rail and the rear guide rail connected to the crossbeam;

a connecting block mounted with a first slider fitting with the front guide rail and the rear guide rail;

a first drive mechanism provided between the crossbeam and the connecting block, which includes a first linear motor for driving the connecting block to move along a first direction parallel to a length direction of the crossbeam, wherein the first linear motor is located between the front guide rail and the rear guide rail, with a first primary of the first linear motor fixedly connected to the bottom surface of the crossbeam, and a first secondary of the first linear motor fixedly connected to a top surface of the connecting block; and a lifting device connected to a bottom surface of the connecting block, which comprises an inner frame, an outer frame, a third drive mechanism, lifting mechanisms and a synchronizing mechanism, wherein the inner frame is configured to connect a printhead bracket, and is moveable relative to the outer frame through the lifting mechanisms located at both sides thereof, both ends of the synchronizing mechanism are respectively connected to the lifting mechanisms, the synchronizing mechanism is configured to synchronize the lifting mechanisms at both sides of the inner frame, and the third drive mechanism is configured to synchronously drive the lifting mechanisms at both sides of the inner frame through the synchronizing mechanism to drive the inner frame to move up and down along a third direction perpendicular to the length direction of the crossbeam;

wherein a left guide rail and a right guide rail are further provided on the bottom surface of the connecting block, a second slider fitting with the left guide rail and the right guide rail is installed on the outer frame, and a second drive mechanism is provided between the connecting block and the lifting device for driving the connecting block to move back and forth along a second direction perpendicular to the length direction of the crossbeam.

2. The inkjet printing structure according to claim 1, wherein the connecting block comprises a suspension area and a motor mounting area located side by side along the length direction of the crossbeam, the first slider includes a plurality of spaced first unit sliders, and the number of the first unit sliders in the motor mounting area is greater than the number of the first unit sliders in the suspension area.

3. The inkjet printing structure according to claim 2, wherein the left guide rail and the right guide rail are symmetrical about a center axis of the suspension area running along the second direction.

4. The inkjet printing structure according to claim 3, wherein the second slider includes a plurality of equidistantly spaced second unit sliders.

5. The inkjet printing structure according to claim 3, wherein the second drive mechanism comprises a second linear motor disposed outside the left guide rail and the right guide rail, with a second primary of the second linear motor connected to the bottom surface of the connecting block, and a second secondary of the second linear motor connected to the outer frame.

6. The inkjet printing structure according to claim 5, wherein the second drive mechanism further comprises two sets of second screw assemblies disposed between the left guide rail and the right guide rail, each set of second screw assembly has a second motor, a second screw and a second nut mounted on the second screw, with an output end of each second motor connected to the respective second screw, and an extension block is provided on the second nut, through which the second nut is connected to the outer frame.

7. The inkjet printing structure according to claim 1, wherein the inner frame comprises four L-shaped vertical rods, first vertical plates fixedly connected to front and rear sides of the L-shaped vertical rods, and second vertical plates fixedly connected to left and right sides of the L-shaped vertical rods; the outer frame comprises an outer frame top panel, third vertical plates fixedly connected to front and rear sides of the outer frame top panel, and fourth vertical plates fixedly connected to left and right sides of the outer frame top panel, with the third vertical plates connected to the fourth vertical plates.

8. The inkjet printing structure according to claim 7, wherein the third drive mechanism includes a third motor or a hand crank, the lifting mechanisms comprise sliding components and third screw assemblies disposed bilaterally, each of the third screw assemblies comprises a third screw and a third nut mounted on the third screw, one end of the third screw is connected to the third motor or hand crank and the other end fixedly connected onto the fourth vertical plate, the third nut is connected to the second vertical plate; the sliding components comprise vertical guide rails and third sliders slidable along the vertical guide rails in contact way.

9. The inkjet printing structure according to claim 8, wherein the synchronizing mechanism comprises a transmission shaft and a gearbox having a first output port connected to the transmission shaft, a second output port connected to the third motor or hand crank, and a third output port connected to the third screw.

10. The inkjet printing structure according to claim 1, wherein at least two gantry frames are fixed on the crossbeam, with inner sides thereof extending to 40~60% of a side surface height of the crossbeam from top to bottom.

11. The inkjet printing structure according to claim 10, wherein three inner sides of each gantry frame are connected to the crossbeam.

12. The inkjet printing structure according to claim 10, wherein each gantry frame has a horizontal rod and two longitudinal rods, both ends of each horizontal rod individually have an extending portion forming an "L" shape with respective longitudinal rods.

13. The inkjet printing structure according to claim 1, wherein a drag chain carrier and a drag chain disposed above the drag chain carrier are connected to one side of the crossbeam, the drag chain carrier is arranged along the length direction of the crossbeam, and a fixed end of the drag chain is located at midsection of the crossbeam and a moving end thereof is connected to the connecting block.

14. The inkjet printing structure according to claim 13, wherein supporting rollers are arranged between the midsection and a right end of the crossbeam and fixed to sides thereof, a height of the support rollers relative to the drag chain carrier is 20%~30% of a height of the crossbeam.

15. The inkjet printing structure according to claim 13, wherein the moving end of the drag chain is connected to the connecting block through a suspension in a "C" shape with two horizontal portions perpendicularly connecting to a vertical portion, and the moving end of the drag chain is connected to the horizontal portion, distal from the connecting block, of the suspension, which horizontal portion is higher than and longer than the supporting rollers.

16. The inkjet printing structure according to claim 1, wherein the crossbeam has an internal cavity divided by a partition plate into two cavities, a reinforcing rib is connected to the inner wall of each cavity.

* * * * *